(12) United States Patent
Forrester

(10) Patent No.: US 6,515,053 B1
(45) Date of Patent: Feb. 4, 2003

(54) LATEX BASED COMPOSITION FOR HEAVY METAL STABILIZATION

(76) Inventor: Keith F. Forrester, P.O. Box 2008, Hampton, NH (US) 03843-2008

( * ) Notice: Subject to any disclaimer, the term of this patent is extended or adjusted under 35 U.S.C. 154(b) by 0 days.

(21) Appl. No.: 09/649,186

(22) Filed: Aug. 28, 2000

(51) Int. Cl.⁷ .................................................. C08K 5/52
(52) U.S. Cl. ........................ 524/140; 524/147; 524/145; 524/493; 524/127
(58) Field of Search ................................ 524/399, 417, 524/425, 115, 127, 126, 128, 131, 139, 140, 145, 147; 510/467

(56) References Cited

U.S. PATENT DOCUMENTS

| | | | |
|---|---|---|---|
| 5,430,233 A | 7/1995 | Forrester | 588/236 |
| 5,536,899 A | 7/1996 | Forrester | 588/256 |
| 5,637,355 A | 6/1997 | Stanforth et al. | 427/341 |
| 5,674,108 A | 10/1997 | Rolle | 451/38 |
| 5,722,928 A | 3/1998 | Forrester | 588/256 |
| 5,827,574 A * | 10/1998 | Stanforth et al. | 427/341 |
| 5,846,178 A | 12/1998 | Forrester | 588/256 |
| 5,860,908 A | 1/1999 | Forrester | 588/256 |
| 5,902,392 A * | 5/1999 | Henkelman et al. | 106/260 |
| 6,001,185 A * | 12/1999 | Huff | 134/2 |
| 6,050,929 A | 4/2000 | Forrester | 588/256 |
| 6,089,955 A * | 7/2000 | Rolle et al. | 451/38 |

* cited by examiner

Primary Examiner—Edward J. Cain
Assistant Examiner—Katarzyna Wyrozebski
(74) Attorney, Agent, or Firm—Hamilton, Brook, Smith & Reynolds, P.C.

(57) ABSTRACT

The invention pertains to latex-based compositions and to methods of their use for stabilizing heavy metal on a surface having heavy metal containing paint thereon. A latex based composition comprising a phosphate stabilizing agent and a slipping agent suspended in a latex, such as a latex-based paint, is applied onto a heavy metal containing painted surface before the heavy metal containing paint is removed. The paint can then be removed by mechanical means to produce paint waste in which the heavy metal is complexed to the phosphate stabilizing agent when exposed to natural or induced leaching conditions.

12 Claims, No Drawings

LATEX BASED COMPOSITION FOR HEAVY METAL STABILIZATION

BACKGROUND OF THE INVENTION

Lead bearing paints have been used for many years at industrial and residential buildings prior to the USEPA ban of such use due to health based concerns over inhalation, ingestion and dermal exposure by children. Lead has been linked to neurotoxic effects in developing infants and children.

Given current demolition in the United States of buildings that contain leaded paint, and the desire of building owners to avoid expensive RCRA lead remedial costs upon demolition of the building and subsequent TCLP lead hazardous waste production, it would be desirable to develop a simple and low cost method for containing lead during building demolition. Methods have been developed to treat lead paint.

SUMMARY OF THE INVENTION

The invention pertains to latex-based compositions and to methods of their use for stabilizing heavy metal on a surface having heavy metal containing paint thereon. A latex based composition comprising a phosphate stabilizing agent and a slipping agent suspended in a latex, such as a latex-based paint, is applied onto a heavy metal containing painted surface before the heavy metal containing paint is removed. The paint can then be removed by mechanical means to produce paint waste in which the heavy metal is complexed to the phosphate stabilizing agent when exposed to natural or induced leaching conditions. The leachability of the heavy metal is reduced such that the paint waste can pass the TCLP, California citric acid leaching test or other leaching test.

In one embodiment, the invention provides a method for reducing heavy metal leaching under natural or induced leaching conditions, from a painted surface containing heavy metal, comprising: applying, onto a surface having painted thereon a heavy metal containing paint, a composition comprising latex based paint, a slipping agent and a phosphate stabilizing agent, wherein the phosphate stabilizing agent binds to the heavy metal to form a heavy metal complex when exposed to natural or induced leaching conditions thereby reducing leaching of the heavy metal from the painted surface. Preferably the stabilizing agent is dicalcium phosphate, tricalcium phosphate or combination thereof.

In another embodiment, the invention provides A method for in situ heavy metal stabilization of heavy metal painted surfaces prior to its creation into waste comprising: a) apply a composition onto a painted surface containing heavy metal; wherein the composition comprising latex based paint, slipping agent and a phosphate stabilizing agent; and b) converting the heavy metal stabilized painted surface into a waste, wherein paint layers exposed are contacted with excess composition.

In yet another embodiment, the invention pertains to a method for producing a sprayable composition for reducing heavy metal leaching, under natural or induced conditions, from a heavy metal painted surface containing, comprising incorporating a phosphate stabilizing agent that substantially maintains the latex paint's adhesive and flowability character, and a slipping agent in an amount sufficient to provide a sprayable viscosity into a latex-based paint to form a sprayable composition.

The invention further provides a latex based paint composition suitable for use in stabilizing lead when coated on a lead containing paint, comprising latex based paint, slipping agent and a phosphate stabilizing agent that substantially maintains the latex paint adhesive and flowability character.

The invention has several advantages. Buildings and other structures containing lead paint, for example, can be treated with the compositions of this invention prior to their demolition or deleading. The methods sufficiently stabilize the heavy metal in the paint waste even as debris from demolition. The methods are easy and have significant economic advantage over other methods currently used to dispose of heavy metal containing paint on buildings slated for demolition. No methods are required to remove the heavy metal containing paint prior to demolition and no RCRA permitting is required for hazardous treatment or handling of the paint waste.

DETAILED DESCRIPTION OF THE INVENTION

It has been discovered that heavy metal in paints can be stabilized in situ by incorporating a phosphate stabilizing agent and slipping agent into a latex-based paint. The latex-based paint can be applied onto a painted surface, whereby the stabilizing agent reacts with the heavy metal to produce a complex that has reduced leachability under natural, acidic or induced leaching conditions. Any surface that can be painted can be treated according to the methods of this invention, such as, but not limited to, bricks, steel, wood, plaster, dry wall and cement. This coating preparation can be applied to any surface coated with lead paint. Specifically, it can be used for outdoor surfaces of building, bridges, industrial machinery, petroleum tanks and the like. Additionally, it can be used on indoor surfaces such as walls, floors and ceiling of homes or businesses.

The invention can be used to stabilize lead, for example, in a building, bridge, boat or other structure that contains heavy metal containing paint. The invention is particularly suited for lead stabilization prior to demolition of the building, bridge, boat or other structure. This process is referred to herein as an in situ stabilization process as the lead is stabilized upon application to the painted surface and as the undercoated paint layers become exposed, such as during demolition. It is not necessary to first remove the heavy metal containing paint from the structure prior to its treatment/stabilization. The process should provide a sufficient amount of stabilizing agent to the heavy metal containing paint, such that even untreated surfaces exposed by demolition are stabilized. Once treated, the heavy metal containing paint will resist leaching of lead and other metals in the paint, such as, but not limited to, copper, zinc, cadmium, nickel, barium, chromium and combinations of these.

The amount of latex-based paint applied to a surface to be treated should be sufficient to provide enough stabilizing agent to complex with the heavy metal contained in the paint to reduce heavy metal leaching under natural or induced leaching conditions, such as, but not limited to, the toxicity characteristic leaching procedure as set forth in the Federal Register, Vol. 55, No. 61 (Mar. 29, 1990) and which corresponds in pertinent part to the procedure set forth in the Federal Register, Vol. 55, No. 126, pp 26985–26998 (Jun. 29, 1990). Preferably two coats of latex-based paint will be applied to the surface. While not intending to be bound by theory, it is believed that the first coating layer stabilizes heavy metals on the surface and the second coating layer provides excess phosphate that is available for treating heavy metal on surfaces that are exposed upon demolition. When the coating is subjected to leaching conditions, e.g., rainwater or TCLP, the phosphate is solubilized and is redistributed (or seeded) to the heavy metal containing surfaces that were not treated, i.e., those surfaces exposed by demolition. Lead containing debris treated according to the methods of the invention passed TCLP. See Examples.

The latex paint used herein can be formulated from any commercially available latex-based paint. Examples of suitable phosphate stabilizing agents include, but are not limited to, phosphate powdered apatites, such as dicalcium phosphate, tricalcium phosphate, coproduct (from aluminum rinse washing, e.g., sulfuric acid, phosphoric acid and aluminum), trisodium phosphate and combination thereof. Dicalcium phosphate (DCP) and tricalcium phosphate (TCP) are preferred, with tricalcium phosphate such as food grade tricalcium phosphate in powdered form being most preferred. It is desirable to select a phosphate stabilizing agent that has a neutral or alkaline pH. Phosphate stabilizing agent(s) is/are admixed into a latex-based paint. The amount of the phosphate stabilizing agent should be sufficient to complex with the heavy metal contained in the paint to be stabilized. In particular, the amount of phosphate stabilizing agent is from about 1% to about 50% by weight latex paint. Field testing demonstrated that lead paint was treated to less than the 5.0 ppm TCLP limit from baseline Pb TCLP at 300 ppm using a 50% wwb dose of latex/water/TCP and sodium silicate mix of 1/1/0.5/0.01–0.05. Higher dose ratios of TCP and DCP at 1/1 $PO_4/H_2O$ were also suitable.

The compositions of the invention further comprise a slipping agent to regulate the viscosity of the latex paint since the phosphate stabilizing agent tends to thicken the paint and renders it difficult to spray onto a surface. Any slipping agent that can accomplish this objective yet maintains the general integrity (e.g., maintains its ability to layer the paint and maintains its adhesive properties) of the latex paint can be used. Preferably, the slipping agent is sodium silicate. Industrial surfactants may also be suitable, but possibly interfere with paint by bubble formation during mixing. The amount of slipping agent is preferably less than 1% by weight of the latex-based paint. The order in which the stabilizing agent and slipping agent are added to the latex-based paint is not important.

An efficient and effective method for coating the latex-based stabilizing agent onto a heavy metal containing painted surface is by spraying. Thus, the stabilizing agent incorporated into the latex-based paint should not interfere with spray-ability of the paint. The latex-based paint should maintain its flowable nature so that the sprayer nozzles will not clog. Further, the phosphate stabilizing agent should be chosen such that it does not adversely react with the chemicals that comprise the latex-based paint. For example, phosphoric acid, amber phosphoric acid and green acid are unsuitable for incorporation into latex-based paints as they react violently with the latex paint to generate off-gases and foaming. Super phosphates, such as triple super phosphate, also react adversely with the latex. Any other means for applying the composition onto the painted surface is contemplated such as dipping, brushing or painting.

The composition of the invention can be formulated immediately prior to use or it can be formulated well in advance of use. Under storage conditions, the latex-based paint did not cement.

Wastes subject to regulation are usually tested via the USEPA TCLP extraction method. The TCLP extraction method is referred to by the USEPA SW-846 Manual on how to sample, prepare and analyze wastes for hazardousness determination, as directed by the Resource Conservation and Recovery Act (RCRA). The TCLP test by definition assumes that the waste of concern is exposed to leachate from an uncovered trash landfill cell, thus the TCLP procedure calls for the extraction of the waste with a dilute acid solution which simulates co-disposal with decaying solid waste.

Wastes or materials stabilizable by this method include various types of materials from which heavy metals can leach when subjected to conditions known to cause leaching, such as, but not limited to, natural leaching, runoff, distilled water extraction, sequential extraction, acetic acid, TCLP and/or citric acid leaching or extraction.

The invention has a number of advantages. First, the stabilizing agent is in intimate contact with the lead-bearing (or other heavy metal-bearing) paint and since they are removed together, there will be no question of achieving sufficient mixing between the paint waste and the stabilizing agent. Second, since the paint is treated before it is removed from the surface, the generation of a hazardous waste is eliminated. The treated waste will need to be disposed in accordance with local, state, and federal regulations regarding solid waste disposal, but it will not need to be handled as a hazardous waste. Thus, this treatment process reduces the amount of EPA regulation and reduces time consuming EPA filing requirements. Third, since this technique eliminates the generation of hazardous waste, it will reduce both the short-term cost and long-term liability for anyone with lead painted items.

EXEMPLIFICATION

Formulations of Latex-based Paint

A. 100% wwb dose mixtures of two parts flat white latex (California Paints™) wwb to one part coproduct and a slurry of one part apatite to one part water were all mixed together to produce the latex-based paint stabilizing agent.

B. A latex-based paint was made comprising an admixture of 1.5 parts latex paint, 2 parts water, 2 parts tricalcium phosphate and 1% sodium silicate by weight percent of latex paint.

C. A latex-based paint was made comprising an admixture of 2 parts latex paint, 1 part dicalcium phosphate (DCP), 1 part water and 1% sodium silicate by weight percent of latex paint.

Lead Stabilization

TCLP tests were performed on paint chips containing 16 ppm and 27 ppm lead. Lead leaching under TCLP conditions was reduced to 0.40 ppm and 0.86 ppm, respectively. Results are shown in the table below.

Report No: 1294

Sample ID: FES1-1 Paint Chip/Baseline

Matrix: Water

| Parameter | Lab ID | Result | Quant Limit | Units | Method/ Reference |
|---|---|---|---|---|---|
| Lead, total | 1294-01 | 16 | 0.04 | mg/L | SW846 3$^{rd}$ Ed. 6010B |

Sample ID: FES1-2 Chip/100% dose mix (2 latex/1DCP/1 H$_2$O)
Matrix: Water

| Parameter | Lab ID | Result | Quant Limit | Units | Method/Reference |
|---|---|---|---|---|---|
| Lead, total | 1294-02 | 0.86 | 0.04 | mg/L | SW846 3$^{rd}$ Ed. 6010B |

Sample ID: FES1-3 Paint Chip/Baseline
Matrix: Water

| Parameter | Lab ID | Result | Quant Limit | Units | Method/Reference |
|---|---|---|---|---|---|
| Lead, total | 1294-03 | 27 | 0.04 | mg/L | SW846 3$^{rd}$ Ed. 6010B |

Sample ID: FES1-4 Chip/100% dose mix (2 latex/1 Co-Product)
Matrix: Water

| Parameter | Lab ID | Result | Quant Limit | Units | Method/Reference |
|---|---|---|---|---|---|
| Lead, total | 1294-04 | 0.4 | 0.04 | mg/L | SW846 3$^{rd}$ Ed. 6010B |

While this invention has been particularly shown and described with references to preferred embodiments thereof, it will be understood by those skilled in the art that various changes in form and details may be made therein without departing from the scope of the invention encompassed by the appended claims.

What is claimed is:

1. A latex bases paint composition suitable for use in stabilizing heavy metal when coated on a heavy metal containing paint, comprising:
   latex based paint;
   phosphate stabilizing agent in an amount sufficient to stabilize the heavy metal when coated on the heavy metal containing paint, thereby reducing its ability to leach under natural or induced conditions; and
   a silicate slipping agent that maintains the latex paint adhesive and flowability character.

2. A method for producing a sprayable latex based composition for reducing heavy metal leaching, under natural or induced conditions, from a painted surface containing heavy metal, comprising incorporating into a latex based paint, a phosphate stabilizing agent in an amount sufficient to stabilize the heavy metal when coated on the heavy metal containing paint, thereby reducing its ability to leach under natural or induced conditions, and a silicate slipping agent that maintains the latex paint's adhesive and flowability character wherein the slipping agent is added in an amount sufficient to provide a sprayable viscosity, to thereby form a sprayable latex based composition.

3. The latex based paint composition of claim 1, wherein the phosphate stabilizing agent is selected from the group consisting of phosphate powdered apatites; trisodium phosphate and combinations thereof.

4. The latex based paint composition of claim 3, wherein the phosphate powdered apatite is dicalcium phosphate, tricalcium phosphate and combinations thereof.

5. The latex based paint composition of claim 1, wherein the slipping agent is sodium silicate.

6. The latex based paint composition of claim 1, wherein the amount of phosphate added is sufficient to stabilize the heavy metal to levels permissible by a test selected from the group consisting of Toxicity Characteristic Leaching Procedure, California citric acid leaching test and citric acid leaching test.

7. The method of claim 2, wherein the phosphate stabilizing agent is selected from the group consisting of phosphate powdered apatites; trisodium phosphate and combination thereof.

8. The method of claim 7, wherein the phosphate powdered apatites is dicalcium phosphate, tricalcium phosphate and combination thereof.

9. The method of claim 2, wherein the slipping agent is sodium silicate.

10. The method of claim 2, wherein the amount of phosphate added is sufficient to stabilize the heavy metal to levels permissible by a test selected from the group consisting of Toxicity Characteristic Leaching Procedure, California citric acid leaching test and citric acid leaching test.

11. A latex based paint composition suitable for use in stabilizing heavy metal when coated on a heavy metal containing paint, comprising:
    latex based paint;
    phosphate powdered apatite in an amount sufficient to stabilize the heavy metal when coated on the heavy metal containing paint, thereby reducing its ability to leach under natural or induced conditions; wherein the phosphate powdered apatite is dicalcium phosphate, tricalcium phosphate and combination thereof; and
    a silicate slipping agent that maintains the latex paint adhesive and flowability character.

12. The latex based paint of claim 11, wherein the silicate is sodium silicate.

* * * * *